United States Patent [19]

Roscoe, Jr.

[11] 4,306,707

[45] Dec. 22, 1981

[54] MOLD HANDLING DEVICE

[76] Inventor: Donald J. Roscoe, Jr., 1705 Shady Lane Dr., Gladstone, Mo. 64118

[21] Appl. No.: 148,194

[22] Filed: May 8, 1980

[51] Int. Cl.[3] .................................................. B60P 1/14

[52] U.S. Cl. ...................................... 254/4 R; 254/47; 414/422

[58] Field of Search ................. 254/4 R, 4 B, 4 C, 47; 414/422, 423

[56] References Cited

U.S. PATENT DOCUMENTS

| | | | |
|---|---|---|---|
| 956,631 | 5/1910 | Feldt | 254/47 |
| 1,274,307 | 7/1918 | Moller | 414/422 |
| 1,641,985 | 9/1927 | Nichols | 414/422 X |
| 3,756,561 | 9/1973 | Rendelman | 254/4 R |
| 3,765,648 | 10/1973 | Rasmussen et al. | 254/47 |

*Primary Examiner*—Robert C. Watson

*Attorney, Agent, or Firm*—Lowe, Kokjer, Kirchner, Wharton & Bowman

[57] ABSTRACT

A machine for raising and lowering molds while maintaining the mold components together to prevent the contents from escaping. An upright frame is equipped with caster wheels and a winch which winds up a pair of cables attached to a harness. The harness is applied to the mold and includes a pair of opposed plates on opposite sides of the mold. Straps are extended through eyes presented on the plates and are passed around the mold in a crossing pattern and tightened to hold the mold components together. The cables have looped ends which are received by pins projecting outwardly from the plates of the harness.

10 Claims, 4 Drawing Figures

MOLD HANDLING DEVICE

BACKGROUND AND SUMMARY OF THE INVENTION

This invention relates generally to the handling of molds and deals more particularly with a machine which is used to raise and lower assembled molds with the mold halves held together.

In ceramic molding and other types of molding operations, situations frequently arise which require large molds and their contents to be moved about and manipulated in various fashions. For example, a liquid mixture of clay and water commonly referred to as "slip" is used in connection with the molding of ceramics. The slip is contained in the mold, and the mold must be lifted and then tipped to pour the slip into a tank or another container. Handling of the mold when filled with slip is extremely difficult due to the large sizes of the molds and the heavy weights involved. Consequently, there is a danger of serious injury to workers and damage to equipment if the mold is not handled in a safe manner. Additionally, if the mold halves are not held together firmly enough, the slip can squirt out between them and cause further problems.

It is the principal object of the present invention to provide a mold handling machine for lifting heavy molds while at the same time holding the mold in an upright position with the mold halves firmly together to prevent escape of any materials contained therein.

Another important object of the invention is to provide a mold handling machine of the character described which permits the mold to be raised to the desired height and then tipped to pour the contents out of the open top of the mold.

A further object of the invention is to provide a machine of the character described which includes a sturdy frame structure and hoist mechanism capable of readily handling the heavy loads involved in lifting large molds.

An additional object of the invention is to provide a machine of the character described wherein the frame is portable so that it can be moved into proper position to handle the molds.

Yet another object to the invention is to provide, in a mold handling machine of the character described, a harness device which firmly holds the mold components together during handling of the molds and which may be quickly and easily attached in a secure manner to various types and sizes of molds.

A still further object of the invention is to provide a mold handling machine of the character described which is simple and economical to construct and safe and reliable in operation.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views.

Figure 1:
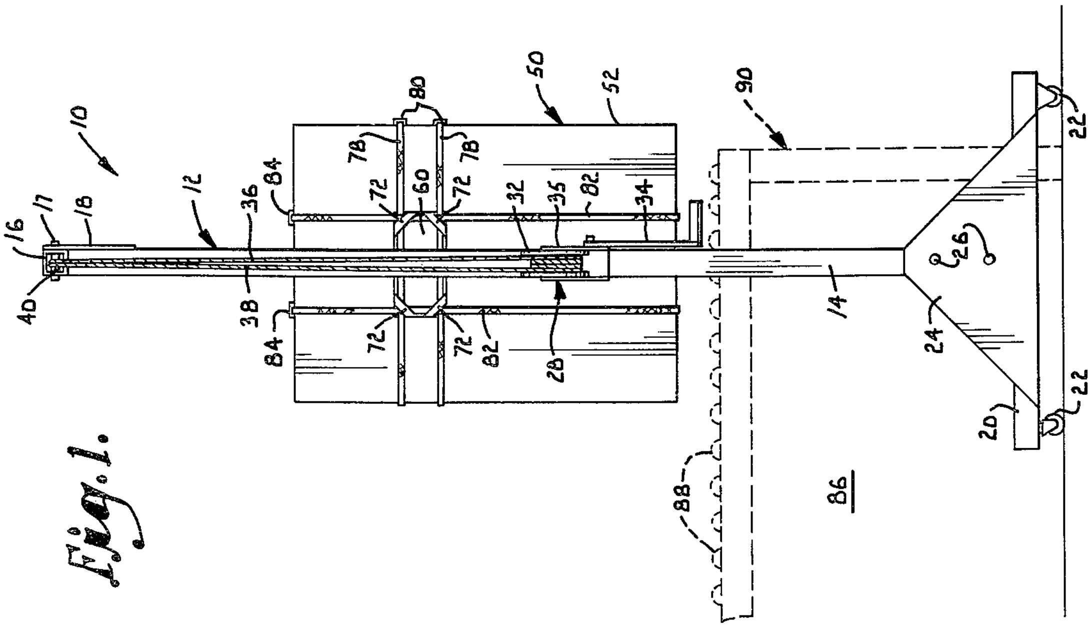
FIG. 1 is a side elevational view of a mold handling machine constructed according to a preferred embodiment of the present invention, with a mold lifted to proper position for pouring of the contents into an underlying tank.
Figure 2:
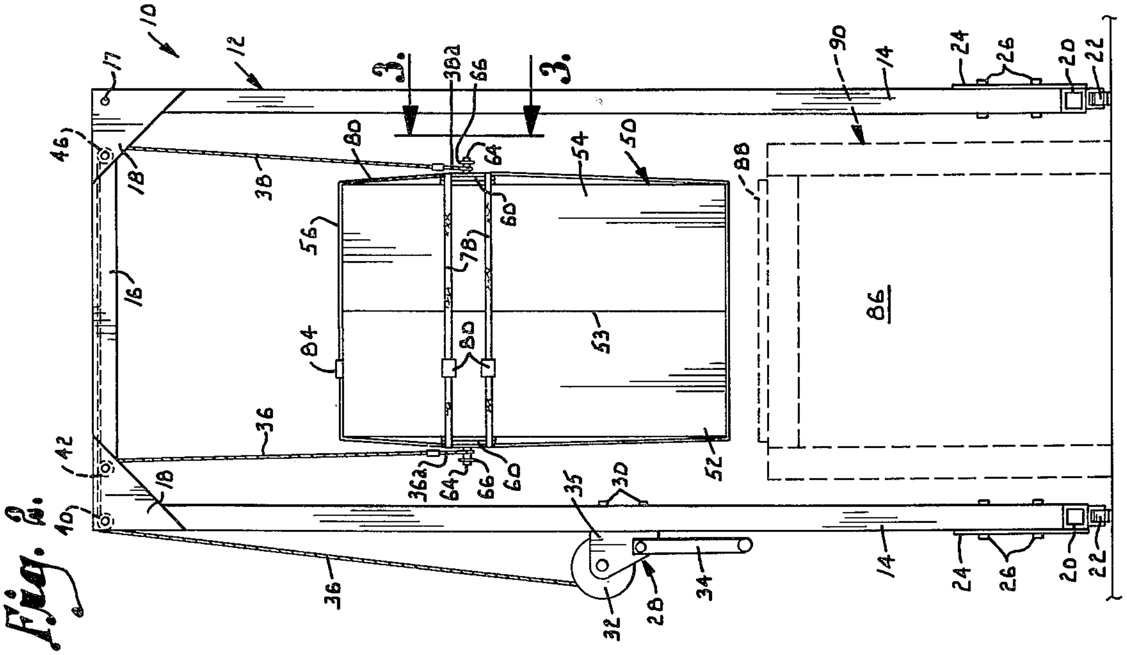
FIG. 2 is a front elevational view of the mold handling machine shown in FIG. 1.

Referring now to the drawing in detail and initially to FIGS. 1 and 2, reference numeral 10 generally designates a mold handling machine constructed in accordance with the present invention. The mold handling machine includes an upright frame 12 having a pair of vertical stanchions 14 each in the form of a square metal tube. An overhead bar which is also in the form of a square metal tube 16 is secured to extend horizontally between the upper ends of stanchions 14 as by bolts 17. Triangular gusset plates 18 reinforce the connections between stanchions 14 and the square tube 16.

Each stanchion 14 connects at its lower end with a horizontal square tube 20 carrying a pair of caster wheels 22 near its opposite ends. The connection between each stanchion 14 and each tube 20 is reinforced by a generally triangular plate 24 which is bolted at 26 to the stanchion. A sturdy, rigid frame is thus provided which may be rolled on the caster wheels 22 along a floor or another supporting surface to the proper position for handling molds, as will be explained more fully.

The machine is provided with a hoist means which is shown in the drawing as a conventional winch 28. It should be understood that winch 28 could take on many alternative forms such as an electric motor drawn shaft mounted on the overhead bar 16 or any other motor operated pulley or drum configuration. In any event winch 28 is shown as being secured by bolts 30 to one of the stanchions 14 at approximately the mid-point thereof. The winch includes a rotary drum 32 and a handle 34 which is suitably geared to the drum such that turning of the handle in opposite directions effects rotation of the drum in opposite directions. The drum and handle are mounted on a bracket 35 secured by bolts 30 to the stanchion. A pair of cables 36 and 38 are suitably secured at one end to the winch drum 32. Each cable 36 and 38 extends upwardly from drum 32 and is passed over a pulley 40 which is mounted for rotation within the hollow interior of tube 16 at one end thereof. After passing over pulley 40, cable 36 is passed over another pulley 42 and extends downwardly through an opening in the bottom of tube 16. A loop **36*a* is formed in the free end of cable 36 and is secured by a ferrule 44. Pulley 42 is mounted for rotation within tube 16 at a location inwardly of pulley 40**.

The other cable 38 passes above pulley 42 and extends through tube 16 over another pulley 46. Cable 38 then extends downwardly through an opening in the bottom of tube 16 and terminates at its free end in a loop **38*a* which is secured by a ferrule 48. Pulley 46 is mounted for rotation within tube 16 near the right end thereof. Pulleys 42 and 46 are spaced apart from one another and are located inwardly of the stanchions 14**.

Reference numeral 50 generally designates a mold which is illustrative of the types of molds which the machine 10 is able to handle. Mold 50 is formed by a pair of mold halves 52 and 54 which fit together in an assembled condition but which may be separated for removal of the molded article. When mold halves 52 and 54 are fit together as shown in FIG. 2, they are joined along a vertical seam 53 and cooperate to form a hollow mold cavity within mold 50. The mold is open at its top to permit fluid materials to be poured into and out of the mold.

Figure 3:
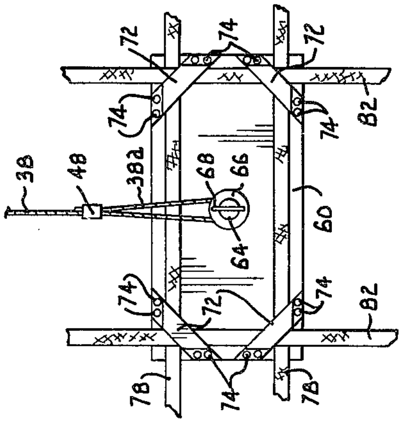
FIG. 3 is a fragmentary elevational view on an enlarged scale taken generally along line 3—3 of FIG. 2 in the direction of the arrows.
Figure 4:
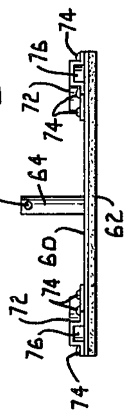
FIG. 4 is a view taken from one edge of one of the plates forming part of the harness device included in the mold handling machine.

The mold 50 is securely maintained in its assembled condition during handling by a harness device which includes a pair of rectangular metal plates 60 that may be applied to flat opposite side portions of the mold halves 52 and 54. With particular reference to FIGS. 3 and 4, each plate 60 is provided on its inside surface with a relatively soft pad 62 which contacts mold 50 in a manner to prevent the rigid metal plates from scratching or otherwise damaging the mold. A pin 64, which may be the shank of a rivet or another fastener used to secure pad 62 in place, projects outwardly from the center of each plate 60. The cable loops 36*a* and 38*a* are looped around pins 64 to mount the harness device on the cables, and a flat washer 66 is fitted on each pin outwardly of the cable loop. A cotter pin 68 is fitted in an opening 70 in the outer portion of each pin 64 to hold washers 56 on the pin. The washers 66 serve as retainers which prevent cable loops 36*a* and 38*a* from slipping off of the pins.

Metal straps 72 are secured to extend across the four corner areas of each plate 60 at a 45° angle relative to the edges of the plate. Each strap 72 is secured to the outside surface of plate 60 by rivets 74 and is raised to its center portion to present an eye 76 between the surface of plate 60 and the raised portion of the strap.

The harness includes a first pair of flexible straps 78 which may be formed of nylon or an other suitable material. Straps 78 are extended horizontally around mold 50 and are spaced apart from one another. The upper strap 78 is threaded through the upper two eyes 76 of each plate 60, while the lower strap 78 is threaded through the lower pair of eyes 76 of each plate. Each strap 78 has a fastener such as buckle 80 (FIGS. 1 and 2) which permits the opposite ends of the strap to be secured tightly together.

The harness includes a second pair of flexible straps 82 which are located in vertical planes when the harness is applied to the mold. Straps 82 are spaced apart from one another and are arranged in a crossing pattern with the horizontal straps 78. One strap 82 is threaded through the eyes 76 located near one edge of each plate 60, while the other strap 82 is threaded through the eyes located adjacent the opposite edge of each plate. Each strap 82 thus crosses each strap 78 within the eyes 76 of each plate 60, and each eye 76 receives one strap 76 and one strap 82. Each strap 82 has a buckle 84 (see FIGS. 1 and 2) by means of which opposite ends of the strap may be secured tightly together.

In use, molds such as the mold 50 are raised and lowered by the mold handling machine 10. With the mold halves 52 and 54 fitted together in the assembled condition, plates 60 are applied to opposite sides of the mold, and straps 78 are threaded through the appropriate eyes 72 and extended completely around the mold. Straps 78 are pulled tightly and secured in a tight condition around the mold by the buckles 80. The straps 82 in the second pair are then threaded through the appropriate eyes 72 of plates 60 and extended vertically along both sides of the mold and horizontally along the open top and the solid bottom portions of the mold. Straps 82 are tightened and firmly secured in place around the mold by buckles 84. When the harness device is applied to the mold 50, plates 60 are located well above the center of the mold to prevent it from inadvertently tipping as it is being raised or lowered.

With the mold 50 resting in an upright position on the floor or another supporting surface and the harness attached to it in the manner indicated, frame 12 is rolled to a position wherein the overhead bar 16 is centered above the mold. Cable loops 36*a* and 38*a* are then applied to pins 64. The handle 34 of winch 28 may then be turned to rotate drum 32 in a direction to wind up cables 36 and 38, thereby raising mold 50 to an elevated position. After the mold has been raised sufficiently, frame 12 may be rolled on its wheels 22 to a position above a tank 86 which is located beneath the rollers 88 of a conventional roller conveyor 90. Pins 64 are coaxial with one another and are oriented horizontally to define a horizontal axis about which mold 50 may be tipped in order to pour the fluid contents thereof out through the open top 56 of the mold and into tank 86 or any other container.

After the fluid has been poured out of the mold, it is returned to the upright position, and frame 12 may then be rolled to any desired location. The mold may be lowered to the floor or another supporting surface by operating winch 28 in a direction to pay out the cables 36 and 38. The cable arrangement is such that both cables 36 and 38 are paid out at the same rate and wound up at the same rate so that mold 50 is not tilted during the raising or lowering operations. After the mold has been lowered to the floor, loops 36*a* and 38*a* may be slipped off of pins 64, and the machine may subsequently be used to handle additional molds. The harness may be removed from the mold by unfastening buckles 80 and 84.

The straps 78 and 82 hold the mold halves 52 and 54 firmly together during handling of the mold. Consequently, the liquids contained within the mold do not leak out through the seam 53 which is formed between the mold halves. In addition to holding the mold halves together in the assembled condition, the harness device also serves to stablize the mold and to attach it to the hoist mechanism in a stable and secure manner. The washers 66 prevent the mold from inadvertently slipping off of the cables. Looping of the cables around the outwardly projecting pins 64 securely attaches the cables to the harness while permitting the mold to be tipped about the horizontal axis provided by the pins and also permitting the cables to be quickly and easily disconnected from the harness. Preferably, the overhead bar 16 of the frame is located directly above the mold during handling to prevent instability which could tend to upset the frame.

The rigid metal plates 60 strengthen the harness device and thus increase the safety of the machine. Threading of straps 78 and 82 through the eyes 76 provides a convenient and reliable manner of attachment of the straps to the plates, while at the same time permitting the harness to be easily removed from the molds. Furthermore, the straps 78 and 82 are able to hold together molds of various types and sizes.

Although the mold handling machine is particularly useful in handling molds which contain a mixture of clay and water known as "slip", it may also be used to handle molds having other types of contents. In actual practice, the machine may be used to raise and lower or otherwise manipulate virtually any type of mold which is too large and/or heavy to safely handle manually.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, we claim:

1. Apparatus for handling a pluarlity of mold components which fit together in an assembled condition to provide an open topped hollow mold adapted to contain fluid material, said apparatus comprising:

an upright frame having a pair of generally vertical stanchions spaced apart from one another and a hollow overhead bar extending between the stanchions at an elevated position;

harness means including a pair of rigid plates adapted to be secured against opposite sides of the mold and a plurality of straps extending around the mold between said plates, said straps having fasteners for securing the straps in extension around the mold to maintain the mold components in the assembled condition;

first and second cables attached to said harness means at spaced apart locations on opposite sides of the mold to define a generally horizontal axis between said spaced apart locations, said cables being attached to said harness means in a manner permitting the mold to be tipped about said axis for pouring of the fluid material out of the mold;

a pin element projecting from each plate away from the mold, said pin elements being substantially coaxial to provide said horizontal axis and said cables having loops which are looped around said pin elements to attach said cables to said rigid plates for raising and lowering of the mold;

first and second pulleys mounted within said overhead bar at spaced apart locations, said first and second cables being passed over the respective first and second pulleys; and a winch mounted to said frame and including a drum which receives said first and second cables, whereby said winch may be operated to turn said drum to thereby raise and lower the mold with the mold components maintained in the assembled condition to retain the fluid material in the mold, and the mold may be tipped about said axis while at a raised position to pour the fluid material out of the open top of the mold.

2. Apparatus as set forth in claim 1, including a third pulley mounted within said overhead bar at a location spaced from the first and second pulleys, said first and second cables being passed over said third cable between the winch and the first pulley and between the winch and the second pulley, respectively.

3. Apparatus as set forth in claim 1, including a plurality of wheels on said frame, said wheels engaging a support surface to permit the frame to be moved along the support surface for positioning of the overhead bar above the mold.

4. In a mold handling apparatus for handling mold components which fit together in an assembled condition to provide an open topped mold adapted to contain liquid therein, the combination of:

a pair of rigid plates adapted to be applied to opposite sides of the mold;

a first pair of straps coupled with each plate and adapted to extend generally horizontally around the mold;

a second pair of straps coupled with each plate and adapted to extend generally horizontally along the top and bottom of the mold and generally vertically along the opposite sides thereof in crossing relation to the first pair of straps;

fastening means for securing each pair of straps in tight extension around the mold to maintain the mold components together in the assembled condition with said plates against opposite sides of the mold; and hoist means adapted for attachment to each plate in a manner permitting the hoist means to raise and lower the mold while permitting the mold to be tipped about a generally horizontal axis for pouring of the liquid out of the open top of the mold.

5. The combination set forth in claim 4, wherein said hoist means includes a pair of cables having looped portions and each plate has a generally horizontal pin element projecting outwardly therefrom, said pin elements receiving the looped cable portions and being substantially coaxial to define said axis.

6. The combination set forth in claim 5, including a retainer on each pin element for retaining the looped cable portion thereon.

7. The combination set forth in claim 4, including a pad on each plate disposed between the plate and the adjacent side of the mold.

8. The combination set forth in claim 4, wherein each plate includes four corners and means presenting an eye in each corner adapted to receive the straps, one strap in said first pair and one strap in said second pair passing through each eye.

9. Apparatus for handling a plurality of mold components which fit together in an assembled condition to provide an open topped hollow mold adapted to contain fluid material, said apparatus comprising:

an upright frame having a pair of generally vertical stanchions spaced apart from one another and a hollow overhead bar extending between the stanchions at an elevated position;

harness means including a pair of rigid plates adapted to be secured against opposite sides of the mold and a first pair of straps attached to each plate and extending generally horizontally around the mold, said harness means further including a second pair of straps attached to each plate and each extending in a generally vertical plane around the mold in a crossing pattern with the first pair of straps;

fastening means associated with each strap for securing same in extension tightly around the mold to maintain the straps in position to hold the mold components in the assembled condition;

first and second cables attached to said harness means at spaced apart locations on opposite sides of the mold to define a generally horizontal axis between said spaced apart locations, said cables being attached to said harness means in a manner permitting the mold to be tipped about said axis for pouring of the fluid material out of the mold;

first and second pulleys mounted within said overhead bar at spaced apart locations, said first and second cables being passed over the respective first and second pulleys; and a winch mounted to said frame and including a drum which receives said first and second cables, whereby said winch may be operated to turn said drum to thereby raise and lower the mold with the mold components maintained in the assembled condition to retain the fluid material in the mold, and the mold may be tipped about said axis while at a raised position to pour the fluid material out of the open top of the mold.

10. Apparatus as set forth in claim 9, wherein each plate includes a plurality of eyes for receiving said straps, each strap being threaded through one eye of each plate.

* * * * *

UNITED STATES PATENT AND TRADEMARK OFFICE

CERTIFICATE OF CORRECTION

PATENT NO. : 4,306,707

DATED : December 22, 1981

INVENTOR(S) : Donald J. Roscoe & Donald J. Roscoe, Jr.

It is certified that error appears in the above-identified patent and that said Letters Patent are hereby corrected as shown below:

On the Title page item [76]

Please add Donald J. Roscoe as an inventor.

Signed and Sealed this

***Seventh* Day of *September 1982***

[SEAL]

*Attest:*

GERALD J. MOSSINGHOFF

*Attesting Officer* *Commissioner of Patents and Trademarks*